Aug. 3, 1954  L. G. GREENWALT  2,685,451
MOUNTING FOR STEERING GEAR IDLER ARMS
Filed June 28, 1950
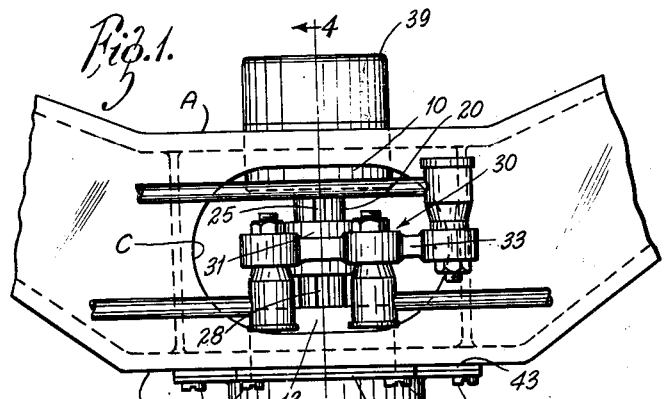
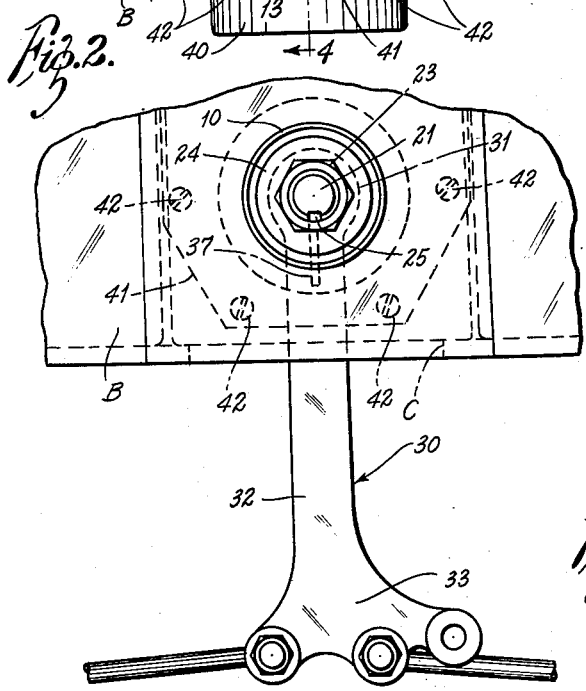
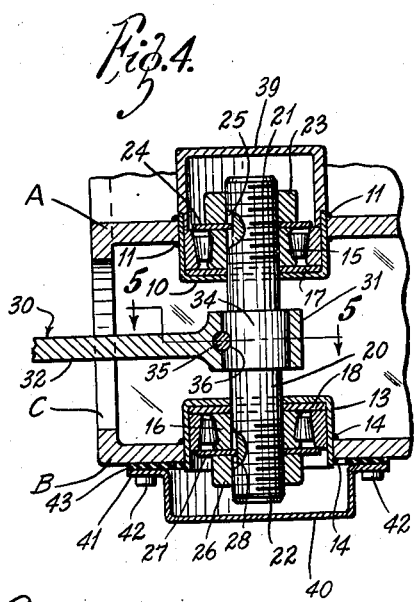
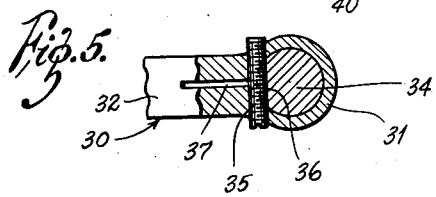
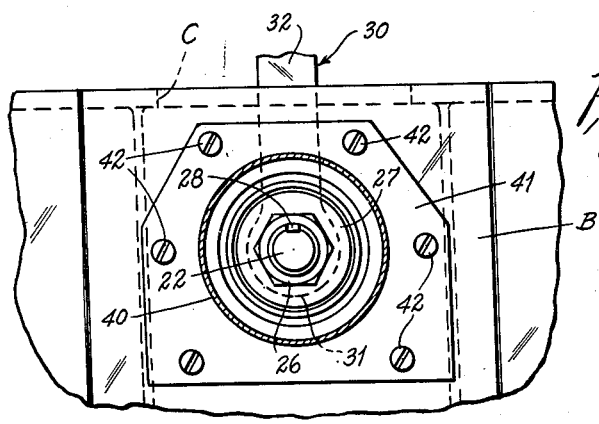
INVENTOR:
LOWELL G. GREENWALT,
BY Kingsland, Rogers & Ezell
ATTORNEYS Patented Aug. 3, 1954

2,685,451

UNITED STATES PATENT OFFICE 2,685,451

MOUNTING FOR STEERING GEAR IDLER ARMS

Lowell G. Greenwalt, Centralia, Ill., assignor of one-half to Leslie F. Wasem, Patoka, Ill.

Application June 28, 1950, Serial No. 170,744

2 Claims. (Cl. 280—95)

This invention relates to steering gears for motor vehicles, and more particularly to a mounting for the idler lever of the steering linkage.

In general, the steering linkage for motor vehicles includes a lever arm actuated by the steering column, a drag link connecting the lever arm with the idler lever, which lever, in turn, is connected with the steering arms of the front wheels of the vehicle by tie rods pivoted at one end to the idler lever and at the opposite end with the right and left steering arms. Since the idler lever is the central element in this linkage, it is important that it be accurately supported for swinging movement in order to keep the wheels in alignment without excess lost motion and also to maintain the linkage so that it may be easily operated from the steering column of the vehicle. Even slight wear between the idler lever pin and its mounting will cause the pivot for the lever to be displaced out of alignment, thereby causing looseness in the entire train of linkage and consequent "shimmying" of the front wheels. Such wear, even slight, also causes the linkage to bind, with consequent stiffness in the operation of the steering gear. Furthermore, it is important to provide a mounting for the idler lever which will be constantly lubricated to avoid wear and permit ease of operation.

It is an object, therefore, of the present invention to provide an improved mounting for the idler lever of steering gears which will overcome some of the defects in the conventional constructions now employed, by providing a mounting that will maintain the idler lever in accurate adjustment for free swinging movement, one which may be readily assembled, and also one that will be relatively free from wear and which may be lubricated by grease packing which is sealed into the unit, thereby avoiding frequent lubrications of the mounting.

Specific additional advantages will appear from the following detailed description taken in connection with the accompanying drawing, in which:

Fig. 1 is a view in elevation illustrating the idler lever and its mounting, together with portions of the front cross frame member that supports the mounting and of the associated linkage shown in broken section;

Fig. 2 is a top plan view with the top grease cup removed and certain of the structure being shown in dotted lines;

Fig. 3 is a bottom plan view in which the bottom grease cup is shown in section and certain of the parts are shown in dotted lines;

Fig. 4 is a sectional view taken substantially on the line 4—4 of Fig. 1;

Fig. 5 is a sectional view taken substantially on the line 5—5 of Fig. 4; and

Fig. 6 is a detailed view of a lock washer construction employed in the assembly.

The idler lever may be supported in a conventional manner in the forward part of the vehicle and, as here illustrated, the idler lever is positioned in the rear of the center of the forward cross member of the vehicle frame, which, as illustrated, is provided with a rearward extension forming a housing for the idler lever mounting, the housing comprising an upper wall A and a lower wall B arranged in spaced parallel relation and having a rear opening C through which the idler lever projects.

The components of the present invention include a cup-shaped member 10 seated in an opening provided in the upper wall A of the housing. This member 10 is of case hardened material and constitutes a raceway for an anti-friction bearing. It is preferably permanently secured in place by welding, as indicated at 11. A similarly cup-shaped member 13 is seated in the lower wall B of the housing and axially aligned with the member 10. The member 13 provides a lower raceway for an anti-friction bearing, and said raceway is secured in place by welding, as at 14. In the raceways, there are roller bearing cones, the upper and lower cone being indicated respectively by reference numerals 15 and 16. There is an oil seal 17 between the inner face of the upper cone and the bottom wall of the upper raceway, and a similar oil seal 18 for sealing the lower anti-friction bearing.

An idler pin 20 has its ends threaded, as indicated at 21 and 22, which idler pin extends through the upper and lower cones of the anti-friction bearings and through the openings in the oil seals 17 and 18, respectively. The idler pin 20 is connected with the cones by a nut and lock washer construction, the nut for the upper connection being indicated at 23 and the upper lock washer being indicated at 24, the tongue of the lock washer entering a slot 25 in the pin 20. The same connecting means is duplicated for the lower connection between the pin and the cone of the lower anti-friction bearing, the lock nut being indicated at 26, the washer at 27, and the tongue engaging in the slot 28.

The idler lever, generally indicated at 30, includes a hub section 31 integral with a lever arm 32, the lever arm being split adjacent to the hub section. At the outer extremity of the lever arm is an enlarged section 33 which has a series of three spaced openings provided for the attachment of the tie rods and the drag link of the steering gear.

The hub section of the idler lever fits over a central enlarged section 34 formed on the pin 20, and is clamped thereon by means of a threaded pin 35 which extends through a threaded hole in the section of the arm 32 just forward of the hub 31, the pin seating in a groove 36 in the section 34 of the pin. The pin 35, when screwed into place, serves as a tight connection between the lever pin and the idler lever, a slight movement for clamping engagement being provided by the slot 37.

In order that the bearings for the idler lever may be lubricated by grease packing, there is provided for the upper bearing a grease cap 39 that fits closely with the upper edges of the member 10. In order to seal the bottom bearing, there is provided a grease cap 40 having an annular flange 41 which is attached to the outer face of the bottom wall by screws 42, with a gasket 43 being interposed between the flange 41 and the face of the lower wall B around the opening in which the member 13 is seated.

It will be understood from the foregoing description that the construction provides for true alignment of the idler pin, and, as the pin has bearing in an anti-friction structure, the chances of wear are greatly minimized and the pin may be oscillated freely, thereby providing for an easy steering operation. Likewise, since the bearings are sealed, they may be lubricated by grease packing so that the necessity of lubrication at frequent intervals is avoided, and the bearings are protected from the entrance of dirt that would cause wear or binding of the idler pin.

It will appear, therefore, that the invention fully accomplishes the objectives heretofore set out.

What is claimed is:

1. In steering gears for vehicles, a housing defined by the vehicle frame and having spaced walls provided with aligned openings therein; a bearing cup including a bottom wall fastened in each opening with the bottom wall of the cup extending inwardly; an opening in the bottom wall of each bearing cup; anti-friction bearings supported in said cups; an idler pin threaded at each end and extending through the openings in the bearing cups for pivotal movement relative to the housing; a longitudinally extending groove in the peripheral surface of the idler pin adjacent each end thereof; a sealing gasket in each bearing cup adjacent the anti-friction bearing and disposed about the idler pin and against the bottom wall; a washer disposed on each end of the idler pin adjacent the anti-friction bearing and containing inwardly extending projections disposed in the grooves in said idler pin to cause them to rotate together; and retaining means threadedly disposed for axial adjustment on each end of the idler pin.

2. In steering gears for vehicles, a housing defined by the vehicle frame including spaced horizontal walls provided with aligned openings therein, and a vertical wall joining said horizontal walls, said vertical wall having a slot therein; a bearing cup including a bottom wall fastened in each opening with the bottom part of the cup extending inwardly of said spaced walls, the bottom wall of each bearing cup being provided with an opening; an idler pin threaded at each end extending through the openings in the bearing cups; a sealing gasket in each bearing cup disposed about the idler pin and against the bottom wall; an anti-friction bearing disposed in each bearing cup adjacent the sealing gasket; a retaining member threadedly disposed on each end of the idler pin; and an idler arm fixed to said pin and extending through said slot in said vertical wall.

References Cited in the file of this patent

UNITED STATES PATENTS

| Number | Name | Date |
|---|---|---|
| 1,471,575 | Simons | Oct. 23, 1923 |
| 1,568,782 | Swayne | Jan. 5, 1926 |
| 2,062,233 | Poirier | Nov. 24, 1936 |
| 2,094,945 | Hesselrode | Oct. 5, 1937 |
| 2,096,116 | Leighton | Oct. 19, 1937 |
| 2,153,083 | Griswold | Apr. 4, 1939 |
| 2,187,197 | Dunham | Jan. 16, 1940 |